United States Patent
Pandey et al.

(10) Patent No.: US 12,482,461 B2
(45) Date of Patent: Nov. 25, 2025

(54) SYSTEMS, METHODS, AND DEVICES FOR WAKEUP WORD DETECTION WITH CONTINUOUS LEARNING

(71) Applicant: Cypress Semiconductor Corporation, San Jose, CA (US)

(72) Inventors: Ashutosh Pandey, Irvine, CA (US); Daniel Watson, Austin, TX (US); Aidan Smyth, Milpitas, CA (US)

(73) Assignee: CYPRESS SEMICONDUCTOR CORPORATION, San Jose, CA (US)

( * ) Notice: Subject to any disclaimer, the term of this patent is extended or adjusted under 35 U.S.C. 154(b) by 246 days.

(21) Appl. No.: 17/820,820

(22) Filed: Aug. 18, 2022

(65) Prior Publication Data

US 2024/0062755 A1    Feb. 22, 2024

(51) Int. Cl.
| | |
|---|---|
| *G10L 15/22* | (2006.01) |
| *G06F 1/3206* | (2019.01) |
| *G10L 15/02* | (2006.01) |
| *G10L 15/08* | (2006.01) |

(52) U.S. Cl.
CPC .......... *G10L 15/22* (2013.01); *G06F 1/3206* (2013.01); *G10L 2015/088* (2013.01); *G10L 2015/223* (2013.01)

(58) Field of Classification Search
CPC ............... G10L 15/22; G10L 2015/088; G10L 2015/223; G10L 25/84; G10L 15/32; G10L 17/24; G10L 15/28; G10L 17/00; G06F 1/3206; G06F 1/1684; G06F 1/3215
See application file for complete search history.

(56) References Cited

U.S. PATENT DOCUMENTS

| | | | |
|---|---|---|---|
| 10,332,543 B1 | 6/2019 | Zopf et al. | |
| 11,620,999 B2* | 4/2023 | Dighe | G10L 15/22 |
| | | | 704/275 |
| 2019/0279641 A1 | 9/2019 | Simileysky et al. | |
| 2020/0125162 A1* | 4/2020 | D'Amato | H04R 29/005 |
| 2021/0224660 A1* | 7/2021 | Song | G06N 3/045 |
| 2021/0350798 A1 | 11/2021 | Zopf et al. | |
| 2022/0343205 A1* | 10/2022 | Yu | G06N 3/082 |
| 2022/0414401 A1* | 12/2022 | Saillet | G06F 18/214 |
| 2023/0124038 A1* | 4/2023 | Li | G05D 1/0297 |
| | | | 700/245 |

* cited by examiner

*Primary Examiner* — Daniel C Washburn
*Assistant Examiner* — Penny L Caudle (57) ABSTRACT

Systems, methods, and devices detect audio signals. Methods may include receiving an audio input at an audio front end circuit, and identifying, using a first circuit, a wake word based, at least in part, on the received audio signal. Methods may also include determining if the identifying performed by the first circuit should be modified based, at least in part, on a designated threshold of accuracy associated with the first circuit and a result of the identifying, the designated threshold of accuracy being determined based, at least in part, on a language processing model of a second circuit. Moreover, the modifying may include adjusting wake word detection operations of the first circuit based, at least in part, on a result of the determining.

20 Claims, 5 Drawing Sheets

SYSTEMS, METHODS, AND DEVICES FOR WAKEUP WORD DETECTION WITH CONTINUOUS LEARNING

TECHNICAL FIELD

This disclosure generally relates to electronic devices, and more specifically, to audio signal detection performed by such electronic devices.

BACKGROUND

Audio and voice control capabilities may be applied in systems and devices in a variety of contexts, such as smart devices and smart appliances. Such smart devices may include smart assistants, also referred to as virtual assistants, that are configured to respond to voice commands. For example, a user may provide a specific phrase that may trigger activation of the smart device. Such a phrase may include one or more specific wake words that wake the smart device, and may cause the smart to device to perform one or more operations. Conventional techniques for processing such wake words remain limited because they are limited in their ability to identify such wake words in a power efficient manner.

DETAILED DESCRIPTION

In the following description, numerous specific details are set forth in order to provide a thorough understanding of the presented concepts. The presented concepts may be practiced without some or all of these specific details. In other instances, well known process operations have not been described in detail so as not to unnecessarily obscure the described concepts. While some concepts will be described in conjunction with the specific examples, it will be understood that these examples are not intended to be limiting.

Systems and devices may be configured to implement voice control functionalities for a variety of purposes, such as for smart devices and smart appliances. For example, smart devices may include smart assistants, also referred to as virtual assistants, that are configured to respond to voice commands. For example, a smart device may be in a dormant state and may be in a sleep mode. In response to detecting a particular auditory input, which may be a particular word, the smart device may wake and listen for a command or a query. Conventional techniques for identifying such voice inputs and commands are limited because they utilize components having high power consumption characteristics and may also include techniques that involve the insecure transmission of data as may occur with transmission of data to cloud-based services.

Embodiments disclosed herein provide audio signal detection techniques having reduced power consumption and increased accuracy in wake word detection. As will be discussed in greater detail below, embodiments disclosed herein perform learning and configuration operations for components used for wake word detection. For example, components of a high performance domain may be modeled, and such a model may be used to selectively utilize such components based, at least in part, on performance of components of a low power domain. In this way, continuous learning and training of the model may be used to control and increase the accuracy of a low power circuit used in such wake word detection, and increase an overall power efficiency by reducing verification operations performed by a high performance circuit.

Figure 1:
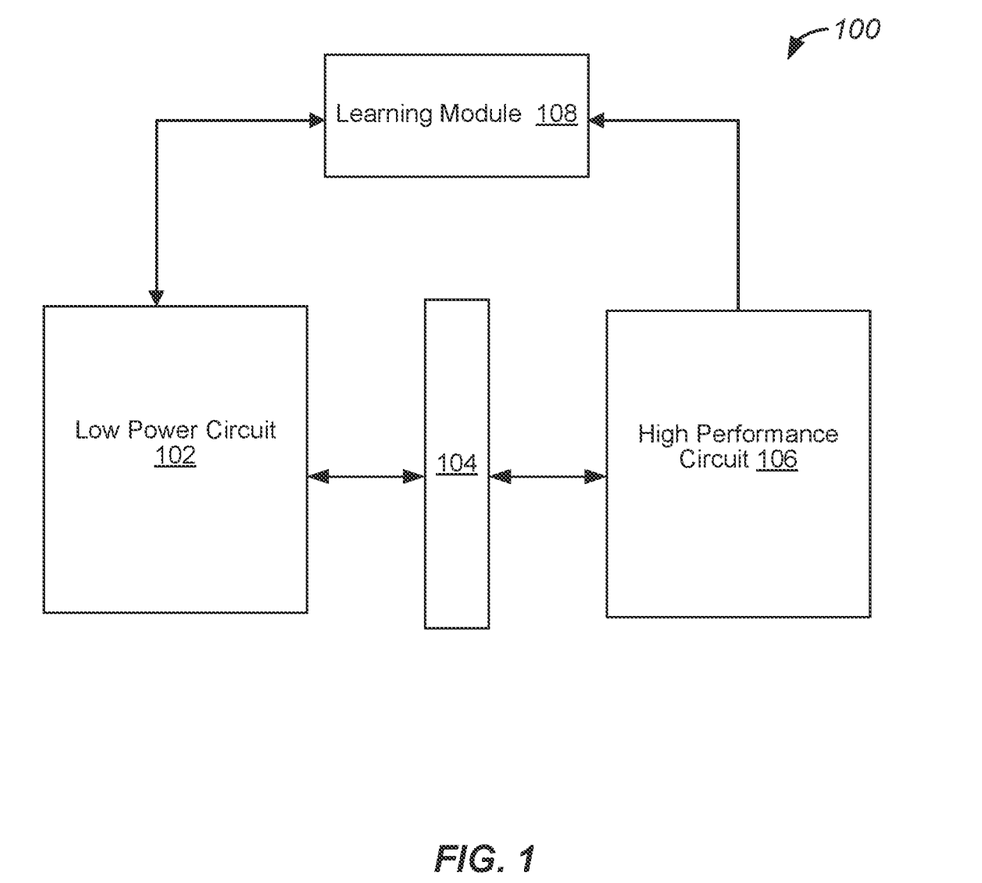
FIG. 1 illustrates a diagram of an example of a device for audio signal detection, configured in accordance with some embodiments.

FIG. 1 illustrates a diagram of an example of a device for audio signal detection, configured in accordance with some embodiments. As will be discussed in greater detail below, a device, such as device 100, may be configured to perform audio signal detection operations, as may be included in wake word detection used by various appliances and devices, such as smart home devices. For example, device 100 may be included in a microcontroller unit (MCU) that may be included in a smart device that may be configured to implement a smart assistant. As discussed above, such a smart assistant may respond to a wake word or a combination of wake words such as "okay" or the name of the smart assistant. As will be discussed in greater detail below, device 100 may be configured to perform low-power and low-latency continuous learning operations to improve the accuracy and power efficiency of wake word detection.

In various embodiments, device 100 includes low power circuit 102 that may be implemented using low power circuitry. In various embodiments, low power circuit 102 has a first power level configured for low power operation. Accordingly, as will be discussed in greater detail below, low power circuit 102 may include one or more processors configured to operate at the first power level. In various embodiments, low power circuit 102 is configured based on reduced design complexity and reduced resource usage. For example, low power circuit 102 may include a staged energy-based activity detection, relative to noise-floor based speech-onset detection and low-complexity pattern recognition operating in a low-dimensional feature space. As will be discussed in greater detail below, such pattern recognition is implemented using a prediction model, which may be a supervised machine learning model. For example, the supervised machine learning model may be implemented using a neural network and/or other machine learning techniques such as decision trees.

As will also be discussed in greater detail below, low power circuit 102 may include processing elements and memory configured to perform wake word detection operations that include operations such as detection of acoustic activity, detection of speech, and detection and identification of a wake word. It will be appreciated that operations, such as acoustic activity detection may be performed in other components as well, such as an audio front end discussed in greater detail below. Once the wake word has been detected, operations may be handed off to high performance circuit 106 for subsequent verification and query handling, as will be discussed in greater detail below.

Device 100 may further include high performance circuit 106 that may include processing elements and memory configured to perform verification operations and query processing operations. In various embodiments, high performance circuit 106 has a second power level configured for high performance operation. Accordingly, as will be discussed in greater detail below, high performance circuit 106 may include one or more processors configured to operate at the second power level. Moreover, the second power level may be higher than the first power level.

In various embodiments, high performance circuit 106 may be configured to verify the wake word detection and identification performed by low power circuit 102, and may be further configured to handle a subsequent query or command issued by a user. Such a query or command may be a user input such as "turn off living room lights" or "what is the time now". Such a query or command may be received as an audio signal after the wake word. As will be discussed in greater detail below, such verification and query/command processing may be implemented using speech recognition components of high performance circuit 106.

As shown in FIG. 1, low power circuit 102 and high performance circuit 106 may be communicatively coupled to each other via interface 104. Accordingly, interface 104 may be configured to provide bidirectional communication between the two domains. In one example, interface 104 is an interface between a first chip used to implement low power circuit 102 and a second chip used to implement high performance circuit 106. As disclosed herein low power circuit 102 may be implemented via a first processor, and high performance circuit 106 may be implemented via a second processor, where the first processor and second processor are different processor cores implemented on a same chip. In such embodiments, synchronization and messages between processors may be handled by interface 104 which may be an inter-processor communication (IPC) interface. In various embodiments, interface 104 may include a circular buffer as part of a shared bus accessible by both low power circuit 102 and high performance circuit 106. An IPC interface may be used to avoid access conflicts to the circular buffer.

In various embodiments, device 100 further includes learning module 108 that is configured to monitor operations performed by both the low power circuit 102 and the high performance circuit 106, and is further configured to modify operation of the low power circuit 102 based on the monitored operations to improve the accuracy of the low power circuit 102. Accordingly, one or more components of high performance circuit 106 may monitor and correct determinations made by low power circuit 102. Thus, as will be discussed in greater detail below, operations of the wake word detection performed by low power circuit 102 may be modified and updated dynamically based on determinations made by learning module 108, thus improving the accuracy of low power circuit 102 and increasing the power efficiency of device 100.

Figure 2:
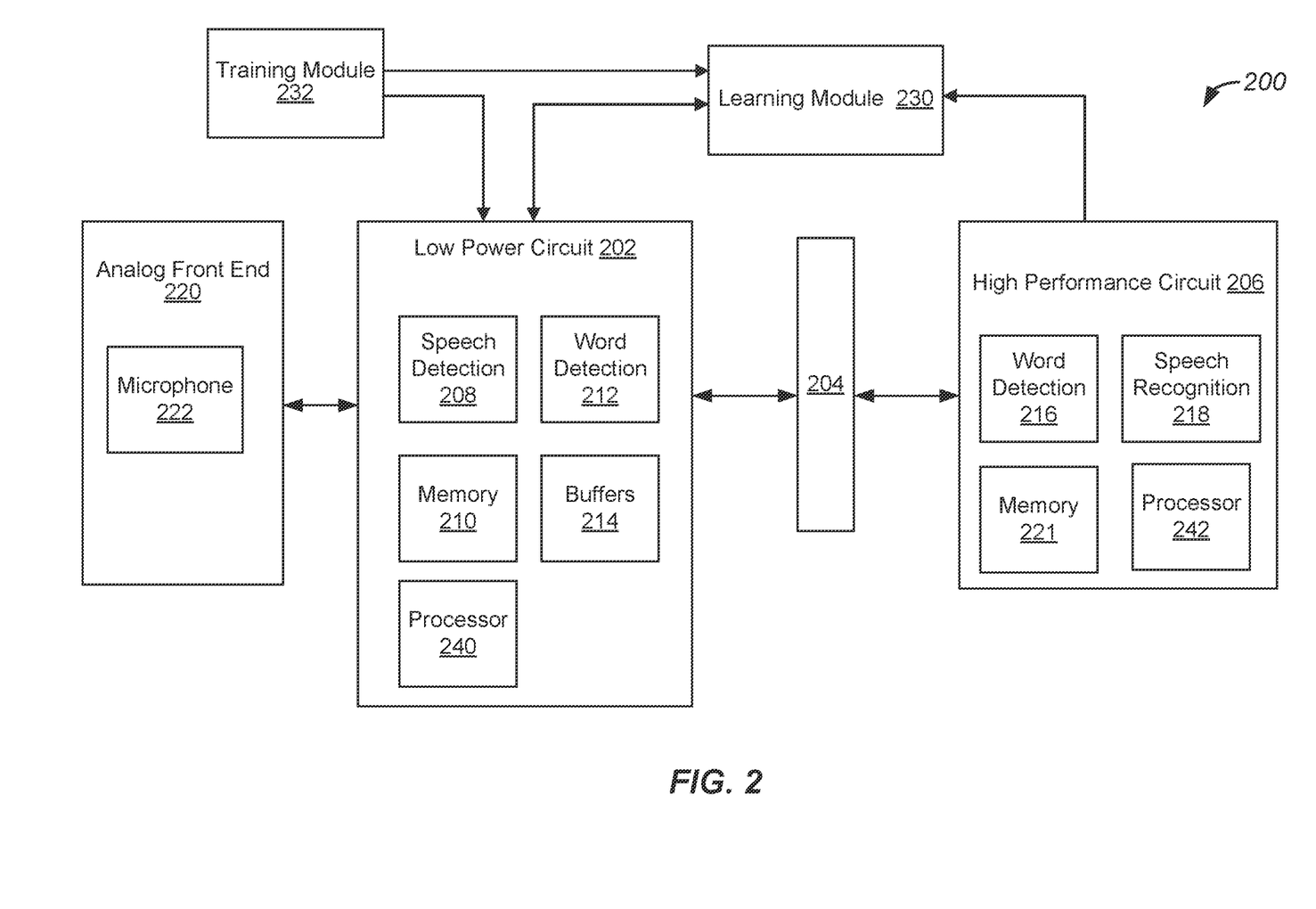
FIG. 2 illustrates a diagram of an example of a system for audio signal detection, configured in accordance with some embodiments.

FIG. 2 illustrates a diagram of an example of a system for audio signal detection, configured in accordance with some embodiments. As similarly discussed above, a system, such as system 200, may be configured to perform audio signal detection operations, as may be included in wake word detection used by various appliances and devices, such as smart home devices. For example, system 200 may include an audio front end as well as various components implemented in a low power circuit and a high performance circuit. In various embodiments, system 200 additionally includes one or more components configured to provide continuous learning and training for the low power circuit.

In various embodiments, system 200 includes audio front end 220 which may include various components configured to receive audio signals. For example, audio front end 220 may include one or more microphones, such as microphone 222. Audio front end 220 may also include analog components, such as amplifiers, as well as associated digital components, such as an analog-to-digital converter and a first-in-first-out (FIFO) register. In some embodiments, components of audio front end 220, such as microphones, may be configured to operate in low power consumption states until a designated threshold of acoustic activity is detected. In various embodiments, the analog components may also include one or more low-power analog comparators and digital counters for acoustic activity detection. Accordingly, audio front end 220 is configured to receive audio signals from an environment in which system 200 is implemented, and is further configured to convert such audio signals into a stream of digital data. As similarly discussed above, such audio signals may include voice or audio commands from a user. Accordingly, speech from a user may be detected via microphone 222 and audio front end 220 may be configured to monitor acoustic signals and dynamically compute and potentially readjust an activation threshold of an audio signal that triggers a speech detection module, as will be discussed in greater detail below.

In various embodiments, system 200 includes low power circuit 202 that may be implemented using low power circuitry. As similarly discussed above, low power circuit 202 may include one or more components configured to perform wake word detection operations that include operations such as detection of acoustic activity, detection of speech, and detection and identification of a wake word. For example, low power circuit 202 may include speech detection module 208 that is configured to detect the presence of speech within a received audio signal. Accordingly, speech detection module 208 is configured to distinguish between ambient sounds and a user's speech.

In various embodiments, speech onset detection is performed by tracking a noise floor through minimum statistics and/or monitoring short term energy evolution. Speech detection module 208 may include a peak energy detector may be configured to track an instantaneous energy against the noise floor to identify speech onset. It will be appreciated that speech detection module 208 may be configured to use any of the speech onset detection algorithms or techniques known to those of ordinary skill in the art. In some embodiments, upon detecting a speech onset event, speech onset detection module 208 asserts a status signal to first word detection module 212.

In various embodiments, during detection operations, the stages are monitored through a state machine where detection progresses through designated states, and may also be implemented with a time-out operation if a designated amount of time elapses. In various embodiments, speech detection module 208 is implemented via software. Accordingly, speech detection module 208 may be implemented using one or more processors included in low power circuit 202, such as processor 240, as well as a memory, such as memory 210 discussed in greater detail below. In another example, speech detection module 208 may be implemented using a dedicated hardware accelerator included in low power circuit 202.

Low power circuit 202 may include first word detection module 212 which is configured to perform a first stage of word detection performed by system 200. Accordingly, first word detection module 212 may be implemented using a dedicated hardware accelerator and may perform an initial word detection operation based on a comparison of the received audio data to that of one or more stored wake words. Accordingly, first word detection module 212 may compare received audio data to a stored designated audio pattern corresponding to a wake word, and may generate an output identifying a result of the comparison. In one example, first word detection module 212 is configured to perform operations such as feature extraction on the received audio data, and to store extracted features in one of buffers 214. In various embodiments, such feature extraction transforms audio data from a time domain to a frequency domain, and patters are identified in the resulting audio spectrum in the frequency domain. For example, Mel-frequency cepstral coefficients (MFCC) may be used for feature extraction. It will be appreciated that any suitable word detection techniques may be used.

Low power circuit 202 may include buffers 214 that are configured to buffer received audio data. Accordingly, buffers 214 may be configured to buffer received audio data and provide such buffered audio data to first word detection module 212 when first word detection module 212 requests such data, as may occur when first word detection module 212 is triggered by speech detection module 208. As will be discussed in greater detail below, a size of buffers 214 may be configured based on requirements of first word detection module 212.

Low power circuit 202 may also include memory 210 which may be a local memory device configured to store software as well as audio data received and processed by speech detection module 208 and first word detection module 212. Accordingly, memory 210 may be configured to store software used to implement one or more modules described above when such modules are implemented as software. As discussed above, low power circuit 202 may include components configured to operate at a first power level. For example, low power circuit 202 may be implemented by using, at least in part, an Arm Cortex M33 core.

System 200 may further include high performance circuit 206 that may include processing elements and memory configured to perform verification operations and query processing operations. More specifically, high performance circuit 206 may include one or more components configured to verify the wake word detection and identification performed by low power circuit 202, and may be further configured to handle a subsequent query or command issued by a user. For example, high performance circuit 206 may include second word detection module 216 which may be configured to verify the word detection performed by first word detection module 212. Accordingly, second word detection module 216 may be configured to perform additional wake word detection operations to increase the accuracy of the wake word detection, and verify the output of first word detection module 212. In various embodiments, second word detection module 216 may be implemented via processor 242 and software stored in a memory, such as memory 221. In some embodiments, second word detection module 216 is implemented via dedicated processing logic, such as that included in a hardware accelerator.

In various embodiments, first word detection module 212 may be configured to implement machine learning techniques, such as one or more neural networks. Second word detection module 216 may be configured to implement machine learning techniques, such neural networks, that utilize a larger model resulting in higher accuracy. In some embodiments, second word detection module 216 may also apply one or more digital signal processing operations, such as filtering/reduction of noise.

High performance circuit 206 may also include speech recognition module 218 which may be configured to process subsequent audio data. For example, in response to second word detection module 216 identifying the presence of a wake word, speech recognition module 218 may be triggered to process subsequent audio data included in the received audio stream. Speech recognition module 218 may be configured to compare the received audio data with one or more designated audio patterns to identify one or more commands. In various embodiments, high performance circuit 206 is configured to use sub-acoustic pattern recognition which are stitched into words, and subsequently used to infer intent or language via word and language modeling techniques. Examples of sub-acoustic units are phonemes and graphenes. The word and/or language modeling can be implemented using n-gram and or neural networks used for natural language processing tasks. It will be appreciated that any suitable speech recognition techniques may be used. Speech recognition module 218 may also be configured to perform one or more function calls in response to the identification of such commands. For example, in response to identifying a command to turn off a set of lights in the user's home, speech recognition module 218 may transmit a request or a call to an application associated with the lights to handle the request.

As discussed above, prediction models may be used for word detection operations. More specifically, machine learning models, which may be supervised machine learning models, may be used to identify extracted patterns in feature data, and to identify words in audio data. Accordingly, such machine learning models may be generated and implemented using a learning phase and an inference phase. In some embodiments, the machine learning models may be neural networks. In various embodiments, neural networks used by low power circuit 202 may be of a lower complexity and less computationally intensive than neural networks used by high performance circuit 206. For example, word detection module 212 of low power circuit 202 may use a first neural network that has fewer neurons and/or features than a second neural network used by second word detection module 216 of high performance circuit 206. In some embodiments, the first neural network may have fewer layers of neurons or connections between neurons than the second neural network. Accordingly, one or more aspects of the neural networks may be configured based on power constraints determined based on the power domain in which the neural network is implemented.

In various embodiments, speech recognition module 218 may be implemented via software stored in a memory, such as memory 221. In some embodiments, speech recognition module 218 is implemented via dedicated processing logic, such as that included in a hardware accelerator. As discussed above, high performance circuit 206 may include components configured to operate at a second power level. For example, high performance circuit 206 may be implemented by using, at least in part, an Arm Cortex M55 core.

As similarly discussed above, low power circuit 202 and high performance circuit 206 may be communicatively coupled to each other via interface 204. Accordingly, interface 204 may be configured to provide bidirectional communication between the two domains. In one example, interface 204 is an interface between a first chip used to implement low power circuit 202 and a second chip used to implement high performance circuit 206.

System 200 additionally includes learning module 230 which, as similarly discussed above, is configured to monitor behavior of low power circuit 202 and high performance circuit 206, and to dynamically modify the operation of low power circuit 202 to improve its accuracy. As will be discussed in greater detail below, learning module 230 is configured to map second word detection module 216 to a latent space of first word detection module 212. More specifically, learning module 230 is configured to monitor behavior and decisions made by first word detection module 212, and measure and observe a separation of a representation of the latent space into positive and negative distributions representative of correct and incorrect decisions made by first word detection module 212 relative to decisions made by second word detection module 216. In various embodiments, the latent space may be modeled using multivariate Gaussian mixture models (GMMs) that may be configured to model subpopulations and associated statistical distributions within a broader population and associated distribution. It will be appreciated that any suitable probabilistic model may be used. Accordingly, learning model 230 may continually monitor decisions made by the word detection models, and may determine when their respective distributions have separated, and more specifically, if defined classes for first word detection module 212 and second word detection module 216 have diverged and separated.

Once the distributions separate into "non-ambiguous" space, as may be determined based on distance estimation techniques described below, learning module 230 may take one or more corrective actions, such as applying one or more weights to the decisions made by first word detection module 212. Moreover, as will be discussed in greater detail below, feedback is provided to first word detection module 212 immediately on a decision-by-decision basis. Thus, performance of first word detection module 212 is improved dynamically and on-the-fly during operation, and first word detection module 212 is provided with continuous learning performance improvements. As used herein, the latent space may refer to a compressed or reduced data space associated with low power circuit 202 and first word detection module 212, and representative of an observable space. Moreover, positive and negative distributions may be generated dynamically based on samples of received audio data. Additional details regarding determining distances between distributions to identify separate distributions are discussed in greater detail below with reference to FIG. 3.

System 200 further includes training module 232 which may be configured to provide training data for one or more of learning module 230 and first word detection module 212. Accordingly, training module 232 may include a training data set that may provide an initial configuration for learning module 230 and first word detection module 212. In this way, an initial configuration of learning module 230 and first word detection module 212 may be performed based on training data included in training module 232. Such training data may be stored by an entity, such as a manufacturer or a user during a configuration process of system 200. In various embodiments, training data for learning module 230 includes a mapping of one or more training examples in an observable space (utilized by, for example, training module 232) to a latent space in which learning module 230 operates. Learning module 230 can utilize labels and/or any attribute associated with the training examples in the observable space to generate a corresponding representation in the latent space. Moreover, during operation of system 200, second word detection module 216 functions as a "teacher" for learning module 230, which in turn trains first word detection module 212.

Figure 3:
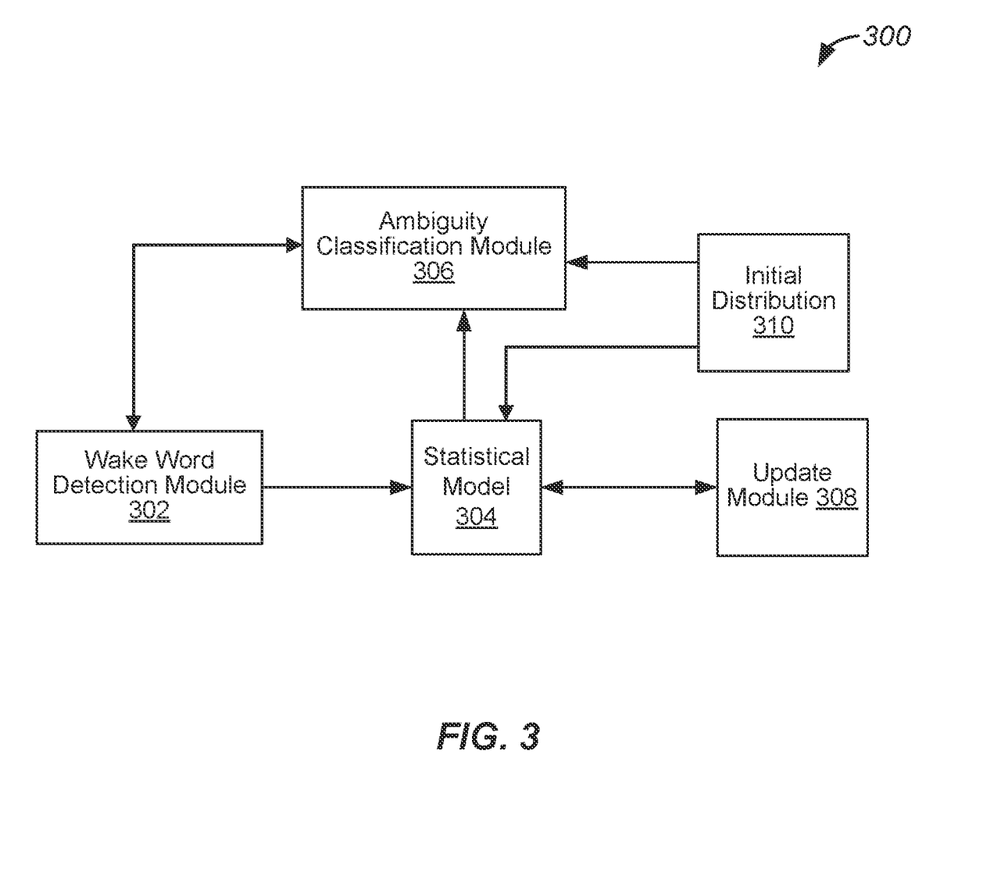
FIG. 3 illustrates a diagram of an example of a device for continuous learning in audio signal detection, implemented in accordance with some embodiments.

FIG. 3 illustrates a diagram of an example of a device for continuous learning in audio signal detection, configured in accordance with some embodiments. In various embodiments, a device, such as device 300, may be configured to perform learning and configuration operations for components used for wake word detection. For example, device 300 may be configured to model components of a high performance domain, and selectively utilize such components based, at least in part, on performance of components of the low power domain. In this way, device 300 may utilize continuous learning and training to generate a model used to control, at least in part, a low power circuit used in such wake word detection and increase power efficiency of usage of a high performance circuit.

Device 300 may include statistical model 304 which is configured to model or represent a wake word detection module of a high performance domain in a low power domain, which may be a latent space of wake word detection module of a low power domain. In various embodiments, the latent space is as an internal state of the learning module that is not directly available to a user, but is utilized by the underlying modules to make one or more decisions. Accordingly, a latent space is a compact and discriminative representation of the data that is configured to represent data in the observable space. In some embodiments, statistical model 304 is configured as an out-of-distribution (OOD) detector. Accordingly, statistical model 304 is configured to model one or more classes of a statistical distribution, and determine whether or not an input represents a word included in or outside of that distribution. While statistical model 304 is described as using various statistical models and inferences, it will be appreciated that any suitable modeling technique may be used.

In various embodiments, classes are user defined labels that are used to identify data of interest (and data not-of-interest). Such classes may be defined by an entity, such as a user or administrator, during a configuration and/or training operation of a system or device disclosed herein. In some embodiments, such labels are provided in an observable space utilized to create a representation for specified labels in the latent space, as similarly discussed above. In various embodiments, an OOD detector is configured to make decisions based on distances from such representations. A representation can be created using clustering methods or statistical inferences from a parametric model. For example, a mean vector statistical distribution can be used as a representation. The distance can be represented as an absolute distance, vector norms, or nearest-neighbor characteristics in a multi-dimension latent space. For example, distance computation techniques may include L2 distance computations, nearest-neighbor computations that may identify a number of closest neighbors to a centroid, maximum likelihood ratio (MLR) computations, or maximum-a-posterior (MAP) estimations.

For example, in an L2 distance computation, a distance between two points in N dimensional space may be given by equation 1 shown below:

$$d(x\_i, x\_j) = \|x\_i - x\_j\|\_2 \tag{1}$$

Moreover, x_i may be represented as shown below by equation 2, and $\|\cdot\|$ represents a root-mean-square-error computation.

$$[x\_i^1, x\_i^2 \ldots x\_i^N] \tag{2}$$

MLR computations may measure a "chance" that an observed distribution belongs to one or more represented in statistical model 304. For example, given a model f(Θ), MLR computations may identify a chance or probability that an observed distribution x_i belongs to f(Θ), and may be denoted as f(Θ/x). If there are multiple models, multiple likelihoods, such as f(Θ_1/x), f(Θ_2/x), . . . may be obtained, and one or more ratios can be used to determine a proximity of the observed data to the model. MAP estimations may be implemented similarly where some prior information can be included in the estimation.

Accordingly, representations may be generated in a latent space and an observable space, and one or the distance computation techniques discussed above may be used for distance calculations. It will be appreciated that other characteristics that separate association can be utilized as well. Such a model may have been generated based, at least in part, on an initial data set included in training data, as may be stored and maintained by initial distribution 310 which may have been generated based on samples taken during a training phase, and may include thousands of audio samples. Accordingly, initial distribution 310 may be generated by an entity, such as a manufacturer or user, and may have been generated based on an available online dictionary. As discussed above, statistical model 304 is configured to model the behavior of a wake word detection module included in a high performance circuit, such as second word detection module 216 discussed above with reference to FIG. 2. Accordingly, statistical model 304 may also be generated based on input received from a wake word detection module of a high performance circuit.

Device 300 additionally includes update module 308 which is configured to update statistical model 304 in response to an input received from the wake word detection module included in a high performance circuit. Accordingly, statistical model 304 may be dynamically updated based on decisions made by a wake word detection module to ensure that statistical model 304 accurately models the behavior of the wake word detection module of the high performance circuit. In various embodiments, such updating may be performed based on online maximum likelihood estimation (online-MLE) techniques or online maximum a posterior (online-MAP) techniques. Such updating may be performed responsive to the identification of a new word that is not included in the existing distribution and dictionary.

Device 300 further includes ambiguity classification module 306 which is configured to measure a separability of distributions to determine if classes have separated. Accordingly, ambiguity classification module 306 may be configured to perform the distance computations discussed above. In some embodiments, classes may be determined to have separated by modeling a latent space using multivariate gaussian mixture models that are configured to monitor a distance between expectations of distributions, and to determine whether or not an ambiguity exists. As discussed above, any suitable technique may be used to determine distances between representations and their associated distributions. Such a distance between distributions may be considered a margin of error, and may be used to determine if a wake word detection module, such as word detection module 302 discussed below, has deviated from an acceptable tolerance of accuracy. Moreover, ambiguity classification module 306 is configured to filter and/or constrain operations performed by components implemented in a high power domain, such as a wake word detection module included in a high performance circuit as well as statistical model 304, thus reducing power consumption. More specifically, ambiguity classification module 306 may be configured to determine if a wake word detection module included in a low power circuit is operating within an acceptable tolerance and thus uses components included in a low power domain, or if additional validation operations are also performed using components included in a high performance domain. In this way, usage of the high performance domain is selectively applied based on determinations made by, at least in part, ambiguity classification module 306.

Device 300 may include or be coupled to wake word detection module 302. As discussed above, wake word detection module 302 may be configured to perform a first stage of word detection in a low power domain. In some embodiments, wake word detection module 302 may be included in a low power circuit, and thus may be configured similar to first word detection module 212 discussed above with reference to FIG. 2. As similarly discussed above, wake word detection module 302 is configured to perform wake word detection operations that may be modulated based, at least in part, on input provided by ambiguity classification module 306. More specifically, if determined to be operating outside of an acceptable tolerance, wake word detection module 302 may be instructed by ambiguity classification module 306 to trigger additional verification operations from a wake word detection module of a high performance domain such that the wake word detection module of a high performance domain is used to verify wake word detection operations performed by wake word detection module 302 in the low power domain.

It will be appreciated that ambiguity classification module 306 may modify operation of wake word detection module 302 in various additional ways. For example, a theta parameter of a likelihood ratio test used by wake word detection module 302 may be modified based on an input received from ambiguity classification module 306. In one example, if wake ambiguity classification module 306 determines that word detection module 302 failing to detect wake words too frequently, the theta parameter may be adjusted to reduce a required distance between distributions. In another example, a statistical model used by wake word detection module 302 may have been trained and guided by a sequence of wake word decisions, as represented by the data discussed above. Ambiguity classification module 306 may modify weights associated with particular decisions, such as correct decisions or decisions within a particular time period, to improve performance of the statistical model used by word detection module 302. In yet another example, multiple statistical models may be stored in the low power circuit and used by wake word detection module 302. Accordingly, wake word detection module 302 may identify and utilize a particular statistical model for wake word detection operations based on one or more weights set by ambiguity classification module 306. In this way, ambiguity classification module 306 may weight and configure models used by word detection module 302 to ensure the most accurate model is used.

Figure 4:
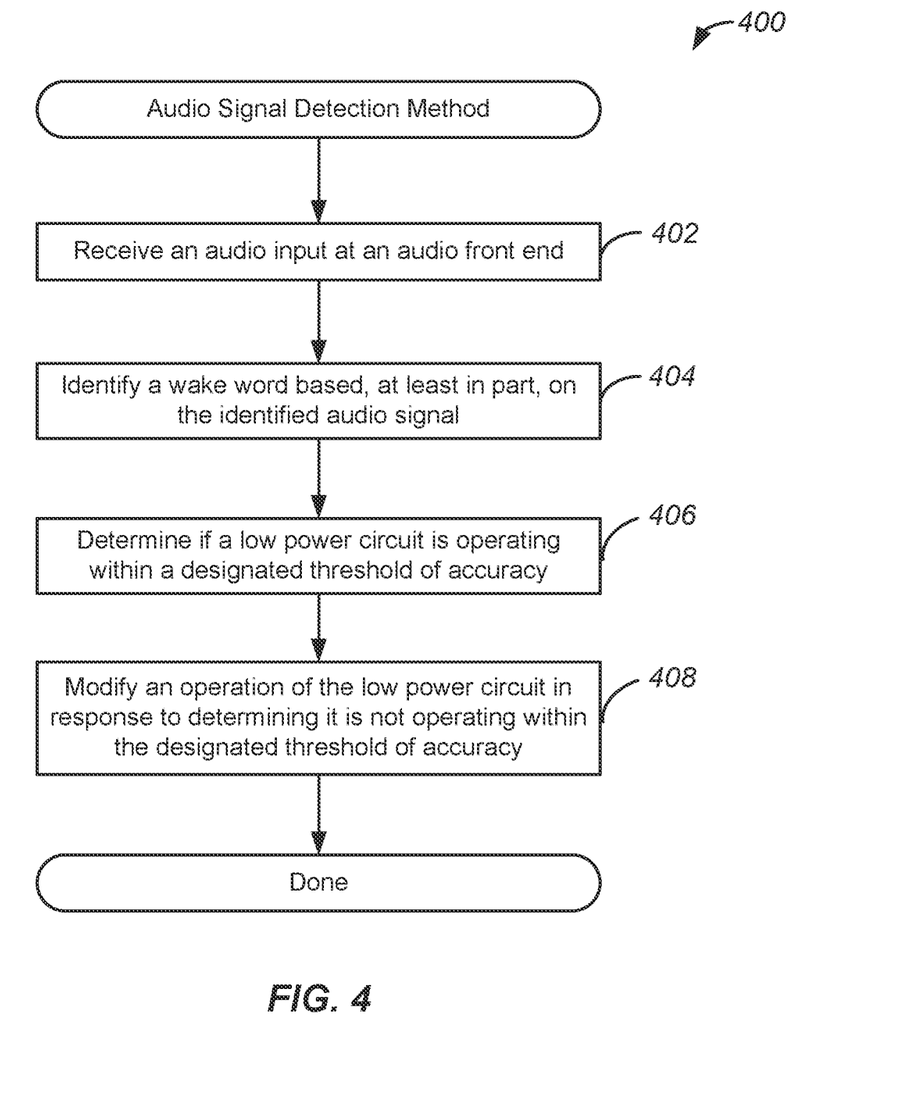
FIG. 4 illustrates a flow chart of another example of a method for audio signal detection, implemented in accordance with some embodiments.

FIG. 4 illustrates a flow chart of an example of a method for audio signal detection, implemented in accordance with some embodiments. As similarly discussed above, a method, such as method 400, may be performed for audio signal detection operations, as may be included in wake word detection used by various appliances and devices, such as smart home devices. As will be discussed in greater detail below, method 400 may provide continuous learning and training for a low power circuit used in such audio signal detection operations.

Method 400 may perform operation 402 during which an audio input may be received. As similarly discussed above, the audio input may be received from an ambient environment in which a smart device or system is implemented.

Accordingly, the audio input may be an audio signal received from such an ambient environment. As also discussed above, the audio input may include voice commands and speech provided by the user.

Method 400 may perform operation 404 during which a wake word may be identified. Accordingly, in response to receiving the audio input and detecting speech received from a user, the received audio data may be processed to identify the presence of one or more wake words. As similarly discussed above, the identification of a wake word may occur in two stages where a first stage is handled by a low power circuit of a smart device or system, and where a second stage is handled by a high performance circuit of a smart device or system. Accordingly, identification and verification of the wake word may be split between the low power and high performance domains, and also used to subsequently trigger query/command processing, as also similarly discussed above.

Method 400 may perform operation 406 during which it may be determined if the low power circuit is operating within a designated threshold of accuracy. As will be discussed in greater detail below, the designated threshold of accuracy may be determined based on a comparison of distributions of a latent space of a wake word detection module of the low power circuit. Accordingly, it may be determined that the low power circuit is operating outside of a designated threshold of accuracy in response to determining that the two distributions have diverged.

Method 400 may perform operation 408 during which the low power circuit may be modified. Thus, operation of the wake word detection module included in the low power circuit may be updated or modified in response to determining that it is operating outside of a designated threshold of accuracy. As will be discussed in greater detail below, such modification or updating of its operation may include weighting decisions made by the low power circuit, or performing additional verification operations using, for example, a high performance circuit.

Figure 5:
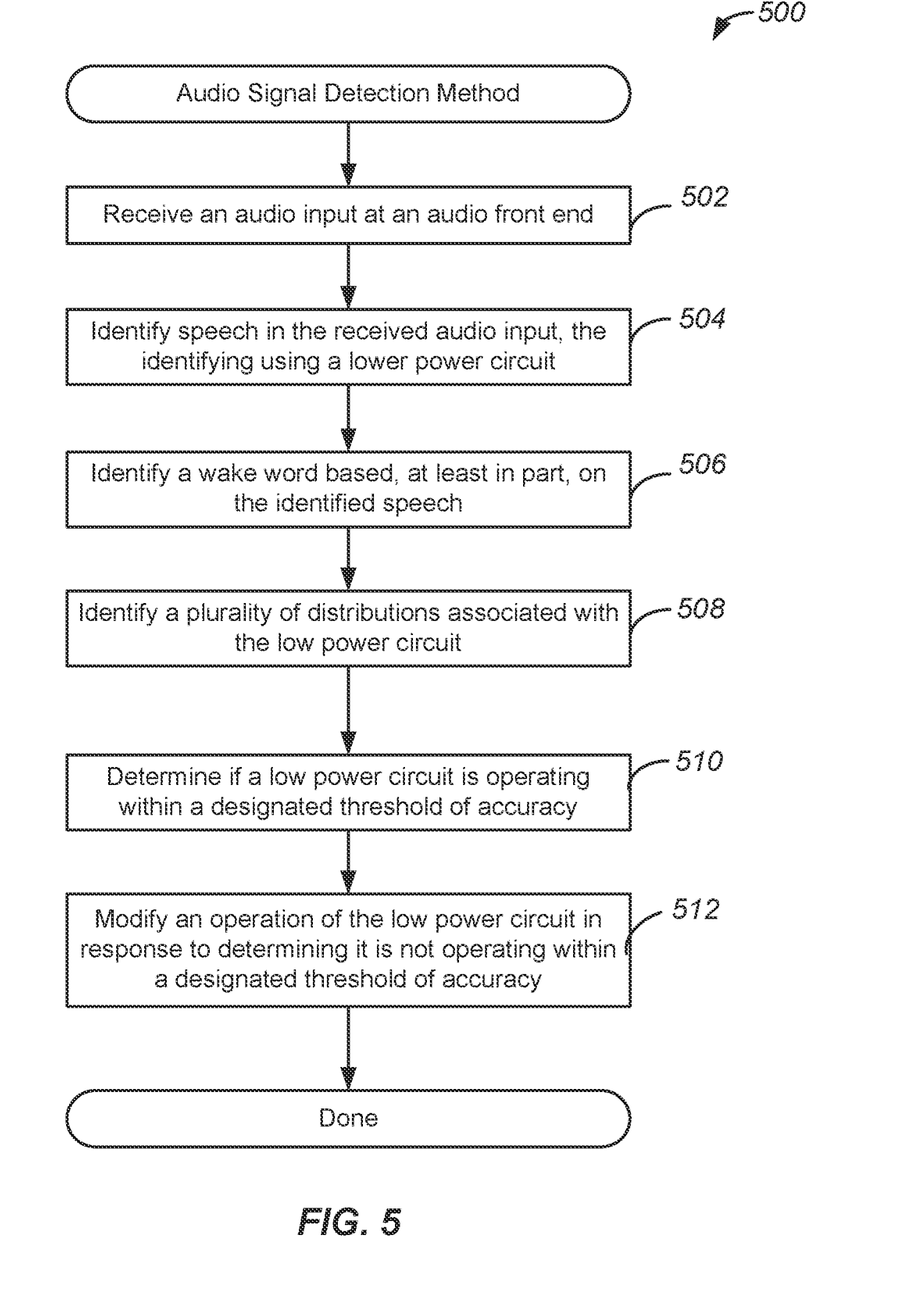
FIG. 5 illustrates a flow chart of an additional example of a method for audio signal detection, implemented in accordance with some embodiments.

FIG. 5 illustrates a flow chart of another example of a method for audio signal detection, implemented in accordance with some embodiments. As similarly discussed above, a method, such as method 500, may be performed for audio signal detection operations, as may be included in wake word detection used by various appliances and devices, such as smart home devices. As will be discussed in greater detail below, method 500 may provide continuous learning and training for a low power circuit used in such audio signal detection operations.

Method 500 may perform operation 502 during which an audio input may be received. As similarly discussed above, the audio input may be received from an ambient environment in which a smart device or system is implemented. Accordingly, the audio input may be an audio signal received from such an ambient environment. As also discussed above, the audio input may include voice commands and speech provided by the user.

Method 500 may perform operation 504 during which speech may be identified in the audio input. Thus, according to various embodiments, the received audio data may be processed to determine if speech has been detected. Accordingly, during operation 504, it may be determined if the received audio data is merely ambient noise, or if the received audio data includes speech and words from a user. As similarly discussed above, such detection of speech may be performed by a low power circuit of a smart device or system. In some embodiments, operation 504 may be performed responsive to determining that no wake word detection operation is being performed. Accordingly, operation 504 may be performed such that it is not triggered if a previous wake word detection operation is already underway.

Method 500 may perform operation 506 during which a wake word may be identified. Accordingly, in response to detecting speech received from a user, the received audio data may be processed to identify the presence of one or more wake words. As similarly discussed above, the identification of a wake word may occur in two stages where a first stage is handled by a low power circuit of a smart device or system, and where a second stage is handled by a high performance circuit of a smart device or system. Accordingly, identification and verification of the wake word may be split between the low power and high performance domains, and also used to subsequently trigger query/command processing, as also similarly discussed above.

Method 500 may perform operation 508 during which a learning module may identify a plurality of distributions. As similarly discussed above, the learning module is configured to map behavior of a wake word detection module of a high performance circuit to a latent space of a low power circuit, and to generate positive and negative distributions based on such a latent space. Accordingly, during operation 508, the learning module may identity such distributions and a separation or distance between such distributions. As similarly discussed above, the learning module may use one or more statistical inferences to determine a distance between representations and associated distributions in a latent space.

Method 500 may perform operation 510 during which it may be determined if the low power circuit is operating within a designated threshold of accuracy. In various embodiments, a designated threshold of accuracy may threshold of accuracy represents a designated percentage of correct wake word identifications. Accordingly, the threshold may be an acceptable error or accuracy rate, or any other suitable measure of accuracy. In various embodiments, the designated threshold of accuracy may be determined based on a comparison of the distributions of a latent space of a wake word detection module of the low power circuit. As similarly discussed above, the determined distance may be used to determine whether or not the distributions are separate, and whether the low power circuit is operating outside of a designated threshold of accuracy. Accordingly, it may be determined that the low power circuit is operating outside of a designated threshold of accuracy in response to determining that the two distributions have diverged and are different or non-ambiguous.

Method 500 may perform operation 512 during which the low power circuit may be modified. Thus, operation of the wake word detection module included in the low power circuit may be updated or modified in response to determining that it is operating outside of a designated threshold of accuracy. Accordingly, such modification or updating of its operation may include weighting decisions made by the low power circuit, or performing additional verification operations using, for example, a high performance circuit. In this way, operation of the low power circuit may be dynamically updated and adjusted to improve accuracy of decisions made in the low power domain.

Although the foregoing concepts have been described in some detail for purposes of clarity of understanding, it will be apparent that certain changes and modifications may be practiced within the scope of the appended claims. It should be noted that there are many alternative ways of implementing the processes, systems, and devices. Accordingly, the present examples are to be considered as illustrative and not restrictive.

What is claimed is:

1. A method comprising:
receiving an audio input at an audio front end circuit;
identifying, using a first circuit, a wake word based, at least in part, on the received audio input;
mapping, using a language processing model, a distribution of decisions made by a second circuit in a latent space of the second circuit to a latent space of the first circuit being a low-dimensional space, and the audio input comprising audio data in an observable space;
generating a designated threshold of accuracy based on a distance threshold between a positive distribution of decisions and a negative distribution of decisions made by the first circuit in the latent space of the first circuit and representing correct and incorrect decisions made by the first circuit as determined relative to the distribution of decisions made by the second circuit after being mapped to the low-dimensional latent space of the first circuit;
determining if the identifying performed by the first circuit should be adjusted based, at least in part, on the designated threshold of accuracy, and
adjusting, using one or more processors, wake word detection operations of the first circuit responsive to determining that the distance between the distributions is greater than the designated threshold of accuracy.

2. The method of claim 1, wherein the first circuit operates at a first power level, and the second circuit operates at a second power level.

3. The method of claim 2, wherein the second power level is higher than the first power level.

4. The method of claim 1, wherein the designated threshold of accuracy represents a designated percentage of correct wake word identifications.

5. The method of claim 4, wherein the designated threshold of accuracy is determined based, at least in part, on a plurality of statistical distributions in a latent space associated with the first circuit.

6. The method of claim 5, wherein the designated threshold of accuracy is determined based, at least in part, on a distance between the first distribution and the second distribution identifying a separation between the first distribution and the second distribution.

7. The method of claim 1, wherein the language processing model represents the second circuit in a latent space associated with the first circuit.

8. The method of claim 7, wherein the language processing model is updated based on one or more wake word identification operations of the second circuit.

9. The method of claim 1, wherein the modifying further comprises:
adjusting one or more weights associated with a wake word identification operation of the first circuit.

10. A system comprising:
an audio front end circuit configured to receive an audio input;
a first circuit comprising one or more processors configured to identify a wake word based, at least in part, on the received audio input; and
a learning module comprising one or more processors configured to:
map a distribution of decisions made by a second circuit in a latent space of the second circuit to a latent space of the first circuit being a low-dimensional space, and the audio input comprising audio data in an observable space;
generate a designated threshold of accuracy based on a distance threshold between a positive distribution of decisions and a negative distribution of decisions made by the first circuit in the latent space of the first circuit and representing correct and incorrect decisions made by the first circuit as determined relative to the distribution of decisions made by the second circuit after being mapped to the low-dimensional latent space of the first circuit; and
determine that the identifying performed by the first circuit should be adjusted based, at least in part, on the designated threshold of accuracy,
the one or more processors being further configured to adjust wake word detection operations of the first circuit responsive to determining that the distance between the distributions is greater than the designated threshold of accuracy.

11. The system of claim 10, wherein the first circuit operates at a first power level, and the second circuit operates at a second power level, and wherein the second power level is higher than the first power level.

12. The system of claim 10, wherein the designated threshold of accuracy represents a designated percentage of correct wake word identifications.

13. The system of claim 12, wherein the designated threshold of accuracy is determined based, at least in part, on a plurality of statistical distributions in a latent space associated with the first circuit.

14. The system of claim 13, wherein the designated threshold of accuracy is determined based, at least in part, on a distance between the first distribution and the second distribution identifying a separation between the first distribution and the second distribution.

15. The system of claim 10, wherein the language processing model represents the second circuit in a latent space associated with the first circuit, and wherein the language processing model is updated based on one or more wake word identification operations of the second circuit.

16. A device comprising:
a first circuit configured to identify a wake word based, at least in part, on a received audio input; and
a learning module comprising one or more processors configured to:
map a distribution of decisions made by a second circuit in a latent space of the second circuit to a latent space of the first circuit being a low-dimensional space, and the audio input comprising audio data in an observable space;
generate a designated threshold of accuracy based on a distance threshold between a positive distribution of decisions and a negative distribution of decisions made by the first circuit in the latent space of the first circuit and representing correct and incorrect decisions made by the first circuit as determined relative to the distribution of decisions made by the second circuit after being mapped to the low-dimensional latent space of the first circuit; and
determine if the identifying performed by the first circuit should be adjusted based, at least in part, on the designated threshold of accuracy,
the one or more processors being further configured to adjust wake word detection operations of the first circuit responsive to determining that the distance between the distributions is greater than the designated threshold of accuracy.

17. The device of claim 16, wherein the first circuit operates at a first power level, and the second circuit operates at a second power level, and wherein the second power level is higher than the first power level.

18. The device of claim 16, wherein the designated threshold of accuracy represents a designated percentage of correct wake word identifications.

19. The device of claim 18, wherein the designated threshold of accuracy is determined based, at least in part, on a plurality of statistical distributions in a latent space associated with the first circuit, and wherein the designated threshold of accuracy is determined based, at least in part, on a distance between the first distribution and the second distribution identifying a separation between the first distribution and the second distribution.

20. The device of claim 16, wherein the language processing model represents the second circuit in a latent space associated with the first circuit, and wherein the language processing model is updated based on one or more wake word identification operations of the second circuit.

* * * * *